United States Patent [19]
Efthymiou

[11] Patent Number: 6,142,840
[45] Date of Patent: Nov. 7, 2000

[54] MOTOR DRIVEN SURFBOARD

[76] Inventor: Perry Efthymiou, 5342 N. California Ave., Apt. #25, Chicago, Ill. 60625

[21] Appl. No.: 09/467,803

[22] Filed: Dec. 20, 1999

[51] Int. Cl.[7] ...................................................... B60L 11/16
[52] U.S. Cl. .............................................. 440/6; 114/55.5
[58] Field of Search ........................ 440/6, 38; 114/55.5, 114/55.51, 55.56, 55.58

[56] References Cited

U.S. PATENT DOCUMENTS

| | | | |
|---|---|---|---|
| 2,434,700 | 1/1948 | Keckley | 440/38 |
| 3,324,822 | 6/1967 | Carter, III | 440/38 |
| 3,481,303 | 12/1969 | Tate et al. | 440/38 |
| 5,582,125 | 12/1996 | Matsumoto | 114/55.5 |

Primary Examiner—Jesus D. Sotelo

[57] ABSTRACT

A motor driven surfboard is provided including a surfboard housing having a top face and a bottom portion integrally coupled to the top face. The bottom portion includes a starboard extent and a port extent. Further provided is a vertical rear face formed between the top face and bottom portion for defining an interior space. The surfboard housing further includes a fin coupled to the bottom portion between the starboard and port extent thereof. Next provided is a pair of water jet passageways having a pair of conduits including a starboard conduit and a port conduit. Each conduit includes a circular entry formed in a center of the respective extent of the bottom portion of the surfboard housing and in communication with a respective circular exit formed in the rear face of the surfboard housing. Also included is a control unit for allowing the manual generation of an actuation signal. Finally, a motor driven propeller is situated within the surfboard housing between the entries and exits of both of the conduits of the passageways. The motor driven propeller is connected to the control unit and adapted to force water through the entries of the conduits and out the exits thereof upon the receipt of the actuation signal thus propelling the surfboard housing forward.

9 Claims, 2 Drawing Sheets

MOTOR DRIVEN SURFBOARD

BACKGROUND OF THE INVENTION

1. Field of the Invention

The present invention relates to a motor driven surfboard and more particularly pertains to propelling a surfboard by way of a motor.

2. Description of the Prior Art

The use of jet powered surfboards is known in the prior art. More specifically, jet powered surfboards heretofore devised and utilized for the purpose of surfing without the need for waves are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,017,166 to Chang; U.S. Pat. No. 260,797 to Calengor et al.; U.S. Pat. No. 289,031 to Monostory; U.S. Pat. No. 4,274,357 to Dawson; U.S. Pat. No. 4,350,113 to Moreau et al.; and U.S. Pat. No. 4,020,782 to Gleason.

In this respect, the motor driven surfboard according to the present invention substantially departs from the conventional concepts and designs of the prior art, and in doing so provides an apparatus primarily developed for the purpose of propelling a surfboard by way of a motor.

Therefore, it can be appreciated that there exists a continuing need for a new and improved motor driven surfboard which can be used for propelling a surfboard by way of a motor. In this regard, the present invention substantially fulfills this need.

SUMMARY OF THE INVENTION

In view of the foregoing disadvantages inherent in the known types of jet powered surfboards now present in the prior art, the present invention provides an improved motor driven surfboard. As such, the general purpose of the present invention, which will be described subsequently in greater detail, is to provide a new and improved motor driven surfboard which has all the advantages of the prior art and none of the disadvantages.

To attain this, the present invention essentially comprises a surfboard housing with a generally triangular top face essentially residing in a single plane. A bottom portion if integrally coupled to the top face and includes a bevelled starboard extent and a bevelled port extent. Such extents form a pointed front with the otp face of the surface board housing. A vertical rear face of the surfboard is formed between the top face and bottom portion for defining an interior space. The surfboard housing further includes a fin coupled to the bottom portion between the starboard and port extent thereof. Such fin depends downwardly from the bottom portion ofthe surfboard housing. As best shown in FIG. 2 & 3, a pair of water jet passageways are defined by a pair of conduits including a starboard conduit. Such starboard conduit has a circular entry formed in a center of the starboard extent of the surfboard housing and is further in communication with a starboard circular exit formed in the rear face of the surfboard housing. A port conduit is also included with a circular entry formed in a center of the port extent of the surfboard housing beside the entry of the starboard conduit. The port conduit resides in communication with a port circular exit formed in the rear face of the surf board housing. A shown in FIGS. 1 & 4, a control unit is provided including a housing with a generally cylindrical configuration. The housing of the control unit has a bulb formed on a top portion thereof and a plurality of undulations formed in a front surface thereof. The control unit is further equipped with an actuation push button switch positioned on a rear face of the housing adjacent the bulb. It should be noted that the switch is adapted for generating an actuation signal upon the depression thereof. With reference now to FIG. 2, a motor driven propeller is situated within the surfboard housing between the entries and exits of both of the conduits of the passageways. In use, the motor driven propeller is adapted to force water through the entries of the conduits and out the exits upon the receipt of the actuation signal. Such action functions to propel the surfboard housing forward. Finally, a cable is connected between the control unit and the motor driven propeller for allowing the transmission of the actuation signal therebetween. The cable has a first end connected to a rear edge of the surfboard housing and a second end connected to a bottom of the housing of the control unit, as shown in FIG. 1.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor driven surfboard which has all of the advantages of the prior art jet powered surfboards and none of the disadvantages.

It is another object of the present invention to provide a new and improved motor driven surfboard which may be easily and efficiently manufactured and marketed.

It is further object of the present invention to provide a new and improved motor driven surfboard which is of durable and reliable constructions.

An even further object of the present invention is to provide a new and improved motor driven surfboard which is susceptible of a low cost of manufacture with regard to both materials and labor, and which accordingly is then susceptible of low prices of sale to the consuming public, thereby making such motor driven surfboard economically available to the buying public.

Still yet another object of the present invention is to provide a new and improved motor driven surfboard which provides in the apparatuses and methods of the prior art some of the advantages thereof, while simultaneously overcoming some of the disadvantages normally associated therewith.

Still another object of the present invention is to propel a surfboard by way of a motor.

Lastly, it is an object of the present invention to provide a new and improved motor driven surfboard is provided including a surfboard housing having a top face and a bottom portion integrally coupled to the top face. The bottom portion includes a starboard extent and a port extent. Further provided is a vertical rear face formed between the top face and bottom portion for defining an interior space. The surfboard housing further includes a fin coupled to the bottom portion between the starboard and port extent thereof. Next provided is a pair of water jet passageways having a pair of conduits including a starboard conduit and a port conduit. Each conduit includes a circular entry formed in a center of the respective extent of the bottom portion of the surfboard housing and in communication with a respective circular exit formed in the rear face of the surfboard housing. Also included is a control unit for allowing the manual generation of an actuation signal. Finally, a motor driven propeller is situated within the surfboard housing between the entries and exits of both of the conduits of the passageways. The motor driven propeller is connected to the control unit and adapted to force water through the entries of the conduits and out the exits thereof upon the receipt of the actuation signal thus propelling the surfboard housing forward.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the various Figures.

DESCRIPTION OF THE PREFERRED EMBODIMENT

Figure 1:
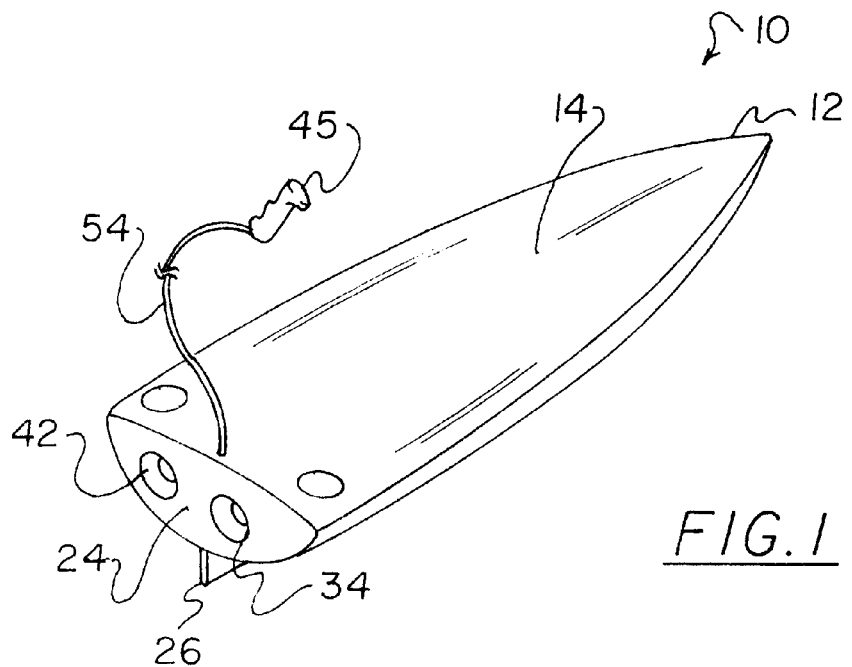
FIG. 1 is a perspective illustration of the preferred embodiment of the motor driven surfboard constructed in accordance with the principles of the present invention.

With reference now to the drawings, and in particular to FIG. 1 thereof, a new and improved motor driven surfboard embodying the principles and concepts of the present invention and generally designated by the reference numeral 10 will be described.

The present invention, the new and improved motor driven surfboard is comprised of a plurality of components. Such components in their broadest context include a surfboard housing, a pair of passageways, a control unit, a motor driven propeller, and a cable. Such components are individually configured and correlated with respect to each other so as to attain the desired objective.

More specifically, it will be noted that the system 10 of the present invention includes a surfboard housing 12 with a generally triangular top face 14 essentially residing in a single plane. A bottom portion 16 is integrally coupled to the top face and includes a beveled starboard extent 18 and a beveled port extent 20. Such extents form a pointed front 22 with the top face of the surface board housing. Further, the bottom portion tapers toward the top face as a function of the proximity to the pointed front. In an alternate embodiment, the front may be defined by a rounded tip. A vertical rear face 24 of the surfboard is formed between the top face and bottom portion for defining an interior space. As shown in the Figures, the rear face has an arcuate bottom edge and a linear top edge. In the preferred embodiment, the surfboard housing has a length of about 4 feet and a height of about 19 inches.

Figure 2:
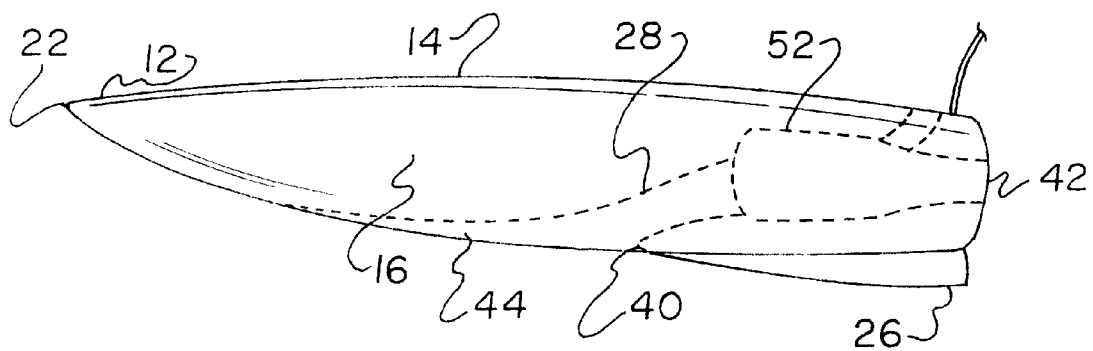
FIG. 2 is a side view of the present invention with dashed lines to indicate the position of the passageways and the motor thereof.

The surfboard housing further includes a fin 26 coupled to the bottom portion between the starboard and port extent thereof. Such fin depends downwardly from the bottom portion of the surfboard housing. As shown in FIG. 2, a length of the fin constitutes less than ⅓ the length of the surfboard housing. Further a height of the fin tapers at a forward end thereof.

Figure 3:
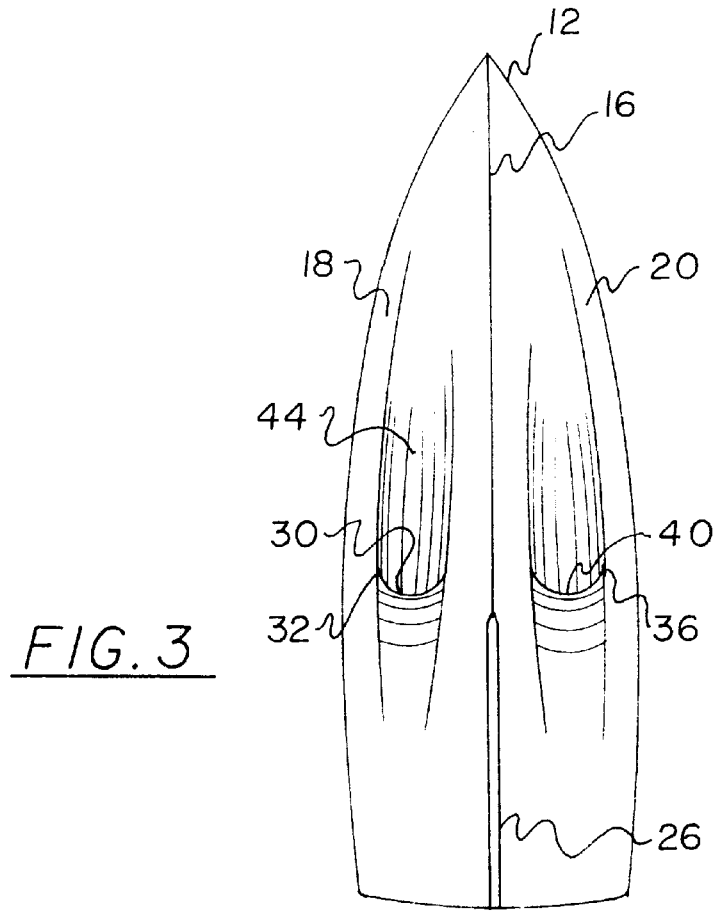
FIG. 3 is a bottom view of the present invention.

As best shown in FIGS. 2 and 3, a pair of water jet passageways 28 are defined by a pair of conduits including a starboard conduit. Such starboard conduit 30 has a circular entry 32 formed in a center of the starboard extent of the surfboard housing and is further in communication with a starboard circular exit 34 formed in the rear face of the surfboard housing. A port conduit 36 is also included with a circular entry 40 formed in a center of the port extent of the surfboard housing beside the entry of the starboard conduit. The port conduit resides in communication with a port circular exit 42 formed in the rear face of the surfboard housing. As best shown in FIG. 2, the entry forms an approximate 30 degree angle with a horizontal. Also, indentations 44 are formed along the bottom portion in coalignment with the entries.

Figure 4:
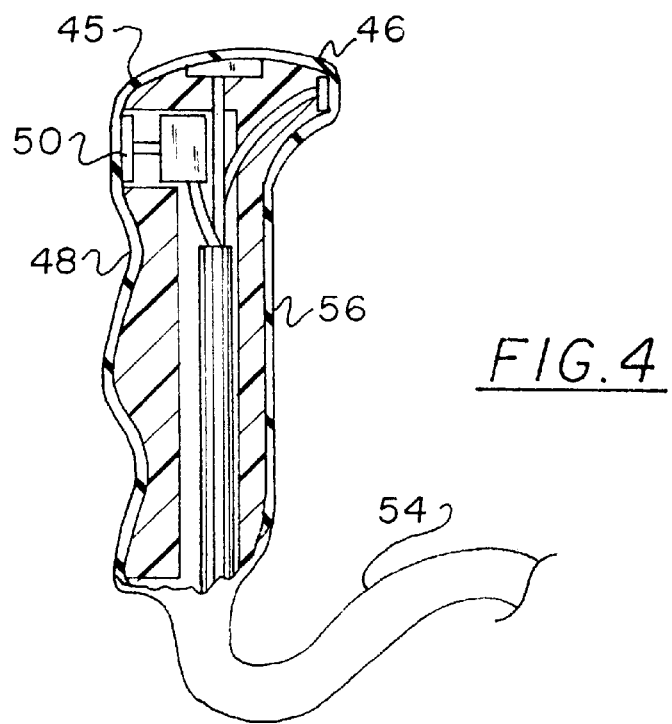
FIG. 4 is a cross-sectional view of the control unit of the present invention.

As shown in FIG. 1 and 4, a control unit 45 is provided including a housing with a generally cylindrical configuration. The housing of the control unit has a bulb 46 formed on a top portion thereof and a plurality of undulations 48 formed in a front surface thereof. The control unit is further equipped with an actuation push button switch 50 positioned on a rear face of the housing adjacent the bulb. It should be noted that the switch is adapted for generating an actuation signal upon the depression thereof. As an option, a plurality of additional buttons may be situated on the control unit to effect the reversal of the motor rotation, deactuation of the motor, and the like. Note FIG. 4.

With reference now to FIG. 2, a motor driven propeller 52 is situated within the surfboard housing between the entries and exits of both of the conduits of the passageways. In use, the motor driven propeller is adapted to force water through the entries of the conduits and out the exits upon the receipt of the actuation signal. Such action functions to propel the surfboard housing forward. The specific details of the motor driven propeller have been excluded for purposes of clarity. U.S. Pat. No. 4,274,375 5o Dawson and U.S. Pat. No. 5,017,166 to Chang are relied upon for disclosing the specific structure of such motor driven propeller and further to exemplify the common nature thereof.

Finally, a cable 54 is connected between the control unit and the motor driven propeller for allowing the transmission of the actuation signal therebetween. The cable has a first end connected to a rear edge of the surfboard housing and a second end connected to a bottom of the housing of the control unit, as shown in FIG. 1. Preferably, the housing of the control unit and the cable are covered with an integral elastomeric sheath 56.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved motor driven surfboard comprising, in combination:
    a surfboard housing having a generally triangular top face essentially residing in a single plane, a bottom portion integrally coupled to the top face and including a beveled starboard extent and a beveled port extent both forming a pointed front with the top face of the surface board housing, and a vertical rear face formed between the top face and bottom portion for defining an interior space, the surfboard housing further including a fin coupled to the bottom portion between the starboard and port extent thereof and depending downwardly therefrom;
    water jet passageways having a pair of conduits including a starboard conduit with a circular entry formed in a center of the starboard extent of the surfboard housing and in communication with a starboard circular exit formed in the rear face of the surfboard housing and a port conduit with a circular entry formed in a center of the port extent of the bottom portion of the surfboard housing and in communication with a port circular exit formed in the rear face of the surfboard housing;
    a control unit including a housing with a generally cylindrical configuration, the housing of the control unit having a bulb formed on a top portion thereof and a plurality of undulations formed in a front surface thereof, the control unit further having an actuation push button switch positioned on a rear face of the housing adjacent the bulb for generating an actuation signal upon the depression thereof;
    a motor driven propeller situated within the surfboard housing between the entries and exits of both of the conduits of the passageways, the motor driven propeller adapted to force water through the entries on the conduits and out the exits upon the receipt of the actuation signal thus propelling the surfboard housing forward; and
    a cable connecting the control unit and the motor driven propeller for allowing the transmission of the actuation signal there between, the cable having a first end connected to a rear edge of the surfboard housing and a second end connected to a bottom of the housing of the control unit.

2. A motor driven surfboard comprising:
    a surfboard housing having a top face, a bottom portion integrally coupled to the top face and including a starboard extent and a port extent, and a rear face formed between the top face and bottom portion for defining an interior space, the surfboard housing further including a fin coupled to the bottom portion between the starboard and port extent thereof and depending downwardly therefrom;
    water jet passageways having a pair of conduits including a starboard conduit with a circular entry formed in a center of the starboard extent of the surfboard housing and in communication with a starboard circular exit formed in the rear face of the surfboard housing and a port conduit with a circular entry formed in a center of the port extent of the surfboard housing and in communication with a port circular exit formed in the rear face of the surf board housing;
    a control unit for allowing the manual generation of an actuation signal; and
    a motor driven propeller situated within the surfboard housing between the entries and exits of both of the conduits of the passageways, the motor driven propeller connected to the control unit and adapted to force water through the entries of the conduits and out the exits thereof upon the receipt of the actuation signal thus propelling the surfboard housing forward.

3. A motor driven surfboard as set forth in claim 2 wherein the control unit includes a housing with a generally cylindrical configuration, the housing of the control unit having a bulb formed on a top portion thereof and a plurality of undulations formed in a front surface thereof.

4. A motor driven surfboard as set forth in claim 3 wherein the control unit further includes an actuation push button switch positioned on a rear face of the housing adjacent the bulb.

5. A motor driven surfboard as set forth in claim 2 wherein a cable connects the control unit and the motor driven propeller for allowing the transmission of the actuation signal there between, the cable having a first end connected to a rear edge of the surfboard housing and a second end connected to the housing of the control unit.

6. A motor driven surfboard as set forth in claim 2 wherein the starboard and port extents of the bottom portion form a pointed front with the top face of the surface board housing.

7. A motor driven surfboard as set forth in claim 2 wherein the starboard and port extents of the bottom portion form a rounded front with the top face of the surface board housing.

8. A motor driven surfboard comprising:
    a surfboard housing having a top face, a bottom portion integrally coupled to the top face and including a starboard extent and a port extent, and a vertical rear face formed bretween the top face and bottom portion for defining an interior space, the surfboard housing further including a fin coupled to the bottom portion between the starboard and port extent thereof and depending downwardly therefrom;
    water jet passageways having at least one conduit with a circular entry formed in the surfboard housing and in communication with a circular exit formed in the rear face of the surfboard housing;
    a control unit including a housing with a generally cylindrical configuration, the housing of the control unit having an actuation push button switch for generating an actuation signal upon the depression thereof; and a motor driven propeller situated within the surfboard housing between the entries and exits of both of the conduits of the passageways, the motor driven propeller connected to the control unit and adapted to force water through the entires of the conduits and out the exits thereof upon the receipt of the actuation signal thus propelling the surfboard housing forward;

wherein a cable connects the control unit and the motor driven propeller for allowing the transmission of the actuation signal there between, the cable having a first end connected to a rear edge of the surfboard housing and a second end connected to the housing of the control unit.

9. A motor driven surfboard comprising, in combination:

a surfboard housing having a generally triangular top face essentially residing in a single plane, a bottom portion integrally coupled to the top face and including a beveled starboard extent and a beveled port extent both forming a pointed front with the top face of the surface board housing, and a vertical rear face formed between the top face and bottom portion for defining an interior space, the rear face having an arcuate bottom edge and a linear top edge, the surfboard housing further including a fin coupled to the bottom portion between the starboard and port extent thereof and depending downwardly therefrom with a height of the fin tapering at a forward end thereof, wherein the surfboard has a length of about 4 feet and a length of the fin constitutes about ⅓ the length of the surfboard housing;

water jet passageways having a pair of conduits including a starboard conduit with a circular entry formed in a center of the starboard extent of the surfboard housing and in communication with a starboard circular exit formed in the rear face of the surfboard housing and a port conduit with a circular entry formed in a center of the port extent of the bottom portion of the surfboard housing and in communication with a port circular exit formed in the rear face of the surf board housing, wherein the entries of the conduits remain in a general parallel relationship and form an approximate 30 degree angle with a horizontal and indentations are formed along the bottom portion of the surfboard housing in coalignment with the entries;

a control unit including a housing with a generally cylindrical configuration, the housing of the control unit having a bulb formed on a top portion thereof and a plurality of undulations formed in a front surface thereof, the control unit further having an actuation push button switch positioned on a rear face of the housing adjacent the bulb for generating an actuation signal upon the depression thereof;

a motor driven propeller situated within the surfboard housing between the entries and exits of both of the conduits of the passageways, the motor driven propeller adapted to force water through the entries of the conduits and out the exits upon the receipt of the actuation signal thus propelling the surfboard housing forward; and a cable connecting the control unit and the motor driven propeller for allowing the transmission of the actuation signal there between, the cable having a first end connected to a rear edge of the surfboard housing and a second end connected to a bottom of the housing of the control unit wherein the control unit and the cable are covered with an integral elastomeric sheath.

* * * * *